United States Patent
Yu et al.

(10) Patent No.: US 12,398,044 B2
(45) Date of Patent: Aug. 26, 2025

(54) METHOD FOR PREPARING AMMONIA BY USING AMMONIUM SALT AND SILICATE

(71) Applicant: YUANCHU TECHNOLOGY (BEIJING) CO., LTD., Beijing (CN)

(72) Inventors: Changjun Yu, Beijing (CN); Qi Wang, Beijing (CN)

(73) Assignee: YUANCHU TECHNOLOGY (BEIJING) CO., LTD., Beijing (CN)

( * ) Notice: Subject to any disclaimer, the term of this patent is extended or adjusted under 35 U.S.C. 154(b) by 997 days.

(21) Appl. No.: 17/601,220

(22) PCT Filed: Aug. 12, 2019

(86) PCT No.: PCT/CN2019/100142
§ 371 (c)(1),
(2) Date: Apr. 4, 2022

(87) PCT Pub. No.: WO2020/199451
PCT Pub. Date: Oct. 8, 2020

(65) Prior Publication Data
US 2022/0234905 A1    Jul. 28, 2022

(30) Foreign Application Priority Data
Apr. 2, 2019 (CN) .................. 201910259782.3

(51) Int. Cl.
*C01C 1/02* (2006.01)
(52) U.S. Cl.
CPC ............. *C01C 1/026* (2013.01); *C01C 1/02* (2013.01)

(58) Field of Classification Search
CPC .................................. C01C 1/02; C01C 1/026
USPC ................................................... 423/356
See application file for complete search history.

(56) References Cited

U.S. PATENT DOCUMENTS

| | | |
|---|---|---|
| 1,718,420 A | 6/1929 | Kessler |
| 2,787,524 A | 4/1957 | Claflin, Jr. |
| 2,823,981 A | 2/1958 | Fuchsman |
| 10,273,166 B2 | 4/2019 | Zhou |

(Continued)

FOREIGN PATENT DOCUMENTS

| | | |
|---|---|---|
| CN | 1032418 C | 7/1996 |
| CN | 101323453 A | 12/2008 |

(Continued)

OTHER PUBLICATIONS

Office Action, including search report, for Chinese Patent Application No. 201910259782.3, dated Nov. 27, 2019, 14 pages.

(Continued)

*Primary Examiner* — In Suk C Bullock
(74) *Attorney, Agent, or Firm* — Westman, Champlin & Koehler, P.A.

(57) ABSTRACT

Disclosed is a method for preparing ammonia gas through a reaction between an ammonium salt and a silicate. An aqueous solution of the ammonium salt in the form of atomized droplets is contacted with a silicate at a high temperature for a reaction to generate ammonia gas and a solid substance. The silicate can be solid particles, and forms a bed. The generated ammonia gas is collected, the solid substance is extracted, part of the same solid substance is mixed with a fresh silicate solid particle, and the mixture continuously reacts with the atomized droplets of the aqueous solution of the ammonium salt.

9 Claims, 3 Drawing Sheets

(56) References Cited

U.S. PATENT DOCUMENTS

| | | | |
|---|---|---|---|
| 2008/0056983 A1* | 3/2008 | Curren | C01B 17/745 423/531 |
| 2014/0356267 A1 | 12/2014 | Hunwick | |
| 2017/0101326 A1 | 4/2017 | Zhou | |
| 2020/0361781 A1 | 11/2020 | Wang | |

FOREIGN PATENT DOCUMENTS

| CN | 102092723 A | 6/2011 |
|---|---|---|
| CN | 102408301 A | 4/2012 |
| CN | 103974757 A | 8/2014 |
| CN | 105417823 A | 3/2016 |
| CN | 107720800 A | 2/2018 |
| CN | 109354039 A | 2/2019 |
| CN | 109626395 A | 4/2019 |
| CN | 109956481 A | 7/2019 |
| CN | 209890262 U | 1/2020 |
| FR | 1385447 A | 1/1965 |
| FR | 1395701 A | 4/1965 |
| JP | S51-59100 A | 5/1976 |

OTHER PUBLICATIONS

Zhao, Xiaofeng, "Study on the Technology for Decomposing of Ammonium Chloride", Chinese Master's Theses Full-test Database, Engineering Science & Technology I, No. 06, Jun. 15, 2015 (Jun. 15, 2015), ISSN: 1674-0246, pp. 34-43, 21 pages.

International Search Report and Written Opinion for International Application No. PCT/CN2019/100142, mailed on Jan. 8, 2020, 19 pages.

Extended European search report for European Patent Application No. 19923584.7, dated Dec. 9, 2022, 6 pages.

\* cited by examiner

METHOD FOR PREPARING AMMONIA BY USING AMMONIUM SALT AND SILICATE

CROSS-REFERENCE TO RELATED APPLICATIONS

This application is a Section 371 National Stage application of International Application No. PCT/CN2019/100142, filed on 12 Aug. 2019, which published as WO 2020/199451 A1, on 8 Oct. 2020, which claims priority to Chinese patent application No. 201910259782.3, filed on Apr. 2, 2019, and entitled by "method for preparing ammonia by using ammonium salt and silicate", the contents of which are incorporated herein by reference in their entireties.

FIELD OF TECHNOLOGY

The present disclosure relates to the field of inorganic salt and sodium carbonate chemical industry, in particular to a method for preparing ammonia by using ammonium salt and silicate.

BACKGROUND

An ammonium salt refers to a product of reaction of ammonia and acid and is an ionic compound consisting of ammonium ions and acid radical ions, the ammonium salt has bad heat stability, and a solid ammonium salt is easily decomposed by heating and is generally decomposed into ammonia and corresponding acid. If the acid is non-volatile, only the ammonia is volatized and escaped and the acid or acid salt is remained in a container. If a corresponding acid is oxidative, the ammonia obtained through decomposition is oxidized at once. The following is an example of a common ammonium salt-ammonium chloride.

The ammonium chloride serving as a byproduct of a combined alkaline preparation method is mainly used for producing composite fertilizer, the ammonium chloride serving as nitrogen fertilizer only utilizes a nitrogen element therein, the valuable chlorine element is wasted, the ammonium chloride is not suitable for crops sensitive to chloride ions, such as tobacco, oranges and sugar canes, soil is damaged by chlorine-based fertilizer, and a late development space is limited, so how to successfully decomposing or converting the ammonium chloride into valuable products to realize deep utilization of resources and effective conversion of the byproduct ammonium chloride of alkali production industry will no doubt be of great practical significance.

At present, there is no large-scale industrialized application of an ammonium chloride decomposition technology in the work, only a small amount of patents and documents have put forward some ideas and tentative exploration for a process for decomposing NH4Cl, for example, Kessler (U.S. Pat. No. 1,718,420) provides a method for obtaining HCl and NH3 step by step by enabling ammonium chloride gas to pass through molten NH4HSO4, Harry C. Claflin (U.S. Pat. No. 2,787,524) discloses a process of preparing ammonia gas and hydrogen chloride by continuously circulating decomposition of ammonium chloride, and Fuchsman etc. (U.S. Pat. No. 2,823,981) and Zhang Zhixin (CN1032418C) provide methods for decomposing NH4Cl by MgO; and the methods are classified into two types, namely an ammonium hydrogen sulfate method and a magnesium oxide method, according to different reactants. Most of the above documents only perform simple description or limited experimental verification on methods for decomposing NH4Cl; furthermore, according to the prior art, the ammonium chloride must react with acidic/alkaline compounds, the process is complex, and there have been no reports on methods for preparing ammonia gas by using direction reaction of ammonium salt such as ammonium chloride and silicate.

SUMMARY

The present disclosure aims to overcome the defects in the prior art and provides a method for preparing ammonia gas through a reaction between ammonium salt and silicate. By the method, the ammonia gas can be obtained only by performing one-step reaction in a reactor, so the reaction steps are simplified and the operation difficulty is reduced, the corrosivity problem caused by HCl generated in some technologies is avoided, the corrosion resistance requirement of equipment materials is reduced and industrialized amplification is facilitated.

The method for preparing the ammonia gas by using the ammonium salt and the silicate, which is provided by the present disclosure, comprises the step of performing reaction on an aqueous solution of ammonium salt and a silicate at a high temperature to prepare the ammonia gas.

The reaction principle of the present disclosure is as follows: the ammonium salt is decomposed to generate acid and ammonia gas (for example, ammonium chloride is decomposed into hydrogen chloride and ammonia gas), the acidic part reacts with the silicate in the presence of water, and the ammonia gas is discharged.

More specifically, the technical scheme of the present disclosure is as follows: the aqueous solution of the ammonium salt in the form of atomized droplets is contacted with the silicate solid particle at a high temperature in a reactor, reaction occurs on the surfaces of the silicate solid particle to generate ammonia gas and a solid substance; and the ammonia gas obtained through reaction is collected to obtain ammonia gas products.

Preferably, in order to increase the conversion rate of the silicate, one part of the solid substance is extracted to serve as waste to be treated, the residual part of solid substance is mixed with fresh silicate solid particle, the mixture returns to the reactor and continuously reacts with the atomized droplets of the ammonium salt aqueous solution.

Preferably, the reactor is a moving bed reactor or a fluidized bed reactor; when the moving bed is adopted, the particle size range of the silicate solid particle is 0.08 to 1.0 mm; and when the fluidized bed is adopted, the particle size range of the silicate solid particle is 0.1 to 0.8 mm.

When the moving bed is used, the silicate solid particle reactants are continuously added into the top of the reactor, and the solid materials move down gradually along with conduction of the reaction and finally are continuously discharged from the bottom; when the fluidized bed is used, high-temperature carrier gas enables the silicate solid particle to be in a suspending motion state, the aqueous solution of the ammonium salt achieves a "liquid bridge" effect after being atomized, so that the silicate solid particle are aggregated, meanwhile, reaction is conducted on the surfaces of the silicate particle to generate the ammonia gas and the solid substance, part of the solid substance serving as a product is discharged, part of the solid substance is doped into the fresh silicate solid particle to enter the reactor, and the aim is to increase the reaction conversion rate.

Preferably, silicate in the silicate solid particle is salt formed by silicate radical and alkali metal as well as alkaline earth metal.

Preferably, the silicate solid particle are solid particle containing one or more of calcium silicate, magnesium silicate, sodium silicate and potassium silicate; and the sources of the silicate solid particle comprise pulverizing and grinding of ore containing the silicate as well as various silicate crystal particle obtained through chemical synthesis methods.

Preferably, the ammonium salt is salt formed by ammonium radical and acid radical of various kinds of strong acid.

Preferably, the ammonium salt is one or more of ammonium chloride, ammonium sulfate and ammonium hydrogen sulfate.

Preferably, the aqueous solution of the ammonium salt is preferably a saturated aqueous solution of the ammonium salt, if concentration is too low, energy consumption is increased and production efficiency is low, because the reaction process of the present disclosure is as follows: the atomized ammonium salt aqueous solution enters the reactor and contacts with the silicate particle at a high temperature, water is evaporated and then the ammonium salt is decomposed, the acidic part of the decomposed ammonium salt (such as hydrogen chloride obtained through decomposition of the ammonium chloride) reacts with the silicate in the presence of water vapor, the alkaline part (ammonia gas) escapes, and if water vapor does not exist, solid ammonium salt is used for reaction, the per-pass conversion rate of the silicate is too low.

Preferably, the temperature of the silicate solid particle is 80 to 600 DEG C., the atomized ammonium salt aqueous solution contacts with the silicate particle at a high temperature and provides energy for decomposition of the ammonium salt, the reaction rate is too low if the temperature of the particle is too low, and energy consumption is huge and water which the ammonium salt contains is evaporated rapidly to be bad for the reaction is the temperature of the particle is too high.

Preferably, a heating source exists in the reactor and supplies heat for the reaction.

Preferably, the atomized droplets of the aqueous solution of the ammonium salt are realized by the following mode: the aqueous solution of the ammonium salt is introduced into a pressure sprayer or a centrifugal sprayer.

Preferably, in the reactor, a ratio of amount of substance of the ammonium salt to amount of substance of the silicate substance in the a silicate solid particle is 1:2-1:6.

The reaction of the present disclosure needs to control the silicate not to be excessive, because the silicate is stable, and the reaction process is reaction of acidic gas and the silicate solid particle, the use amount of the silicate should be increased properly in order to enable all the acidic components to be reacted.

Preferably, the ratio of the extraction quantity of the solid substance to the cyclic use amount of the solid substance returning to the reactor is 1:2-1:8.

Preferably, when a silicate solid particle bed is a particulate moving bed, the heating source in the reactor is high-temperature gas or heat-conducting oil and supplies heat for the reaction through contact between a heat exchange pipe positioned in the reactor and the silicate solid particle moving bed.

Preferably, when a silicate solid particle bed is a fluidized bed, the fluidized carrier gas of the silicate solid particle is air or nitrogen or combination of the air and the nitrogen according to any ratio; and the heating source in the reactor is the fluidized carrier gas and supplies heat for the reaction by preheating the fluidized carrier gas to 300 to 800 DEG C.

Preferably, the temperature of the solid particle at a high temperature is 200 to 450 DEG C.; and in the reactor, a ratio of amount of substance of the ammonium salt to amount of substance of the silicate solid particle (based on the silicate therein) is 1:2-1:4.

The preparation method provided by the present disclosure has the following beneficial effects: the aim of obtaining the ammonia gas is fulfilled by performing in-situ reaction on the atomized ammonium salt aqueous solution and the high-temperature inorganic silicate particle to generate the ammonia gas and the solid substance; and compared with the prior art, the scheme of the present disclosure only needs to perform one-step reaction in a preparation device to obtain the ammonia gas, so the reaction steps are simplified, the operation difficulty is reduced, the corrosion problem caused by HCl generated in some technologies is avoided, the corrosion resistance requirement of equipment materials is reduced and industrialized amplification is facilitated.

BRIEF DESCRIPTION OF THE DRAWINGS

Through description on the embodiments of the present disclosure by the following reference drawings, the above and other aims, characteristics and advantages of the present disclosure are clearer.

DESCRIPTION OF DRAWING LABELS

Embodiment 1: 10—fluidized bed reactor; 11—gas and solid separation device; 12—preheater; 13—gas distributor; 14—high-pressure liquefying pump; 15—solid feeding device; 16—nozzle.

Embodiment 2: 20—deflection baffle; 21—moving bed reactor; 22—heating coiled pipe; 23—high-pressure liquefying pump; 24—nozzle; 25—solid feeding device.

DESCRIPTION OF THE EMBODIMENTS

The present disclosure is described in detail below with reference to the drawings. For clarity, each part of the drawings is not drawn to scale. In addition, some known parts may not be shown.

Many specific details of the present disclosure are described below to understand the present disclosure more clearly. However, the disclosure may be practiced without these specific details, as will be understood by those skilled in the art. The chemical reaction to which the present disclosure relates is as follows:

$$2NH_4^+ + SiO_3^{2-} \rightarrow SiO_2 + 2NH_3\uparrow + H_2O \text{ (in the presence of water)}$$

Figure 1:
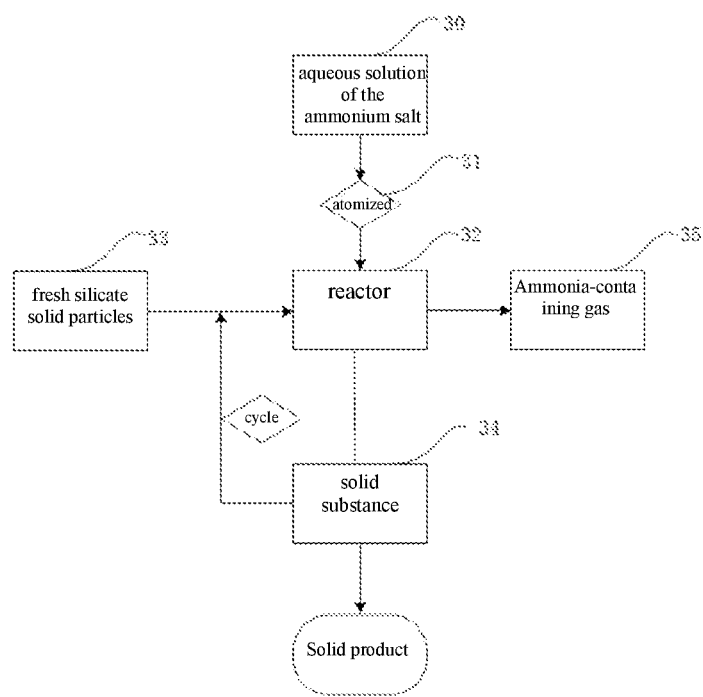
FIG. 1 is a process flow diagram of the present disclosure.

FIG. 1 is a process flow diagram of the present disclosure, in which an atomized 31 ammonium salt aqueous solution 30 is contacted with a silicate solid particle 33 at a high temperature in the reactor 32 to perform reaction to generate a solid substance 34 and an ammonia gas 35; the solid substance 34 is extracted, and part of the solid substance is circulated, to be mixed with the fresh silicate solid particle 33 for entering the reactor 32 and is contacted with the atomized 31 ammonium salt aqueous solution 30 to perform reaction to complete a circulation.

The silicate solid particle of the present disclosure is a solid particle containing one or more of calcium silicate, magnesium silicate, sodium silicate and potassium silicate; the ammonium salt is one or more of ammonium chloride, ammonium sulfate and ammonium hydrogen sulfate.

Embodiment 1

Figure 2:
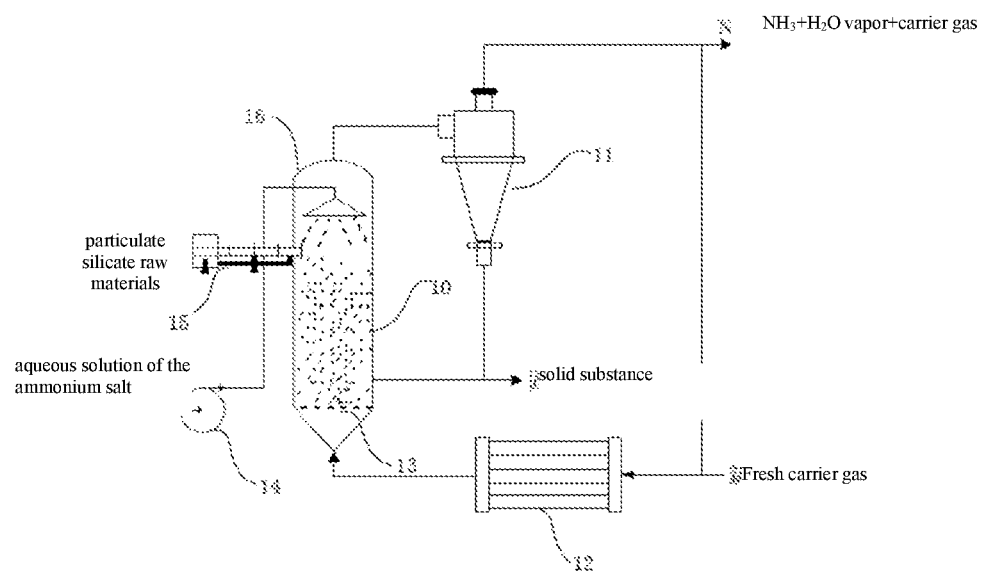
FIG. 2 is a schematic diagram of an embodiment 1 of the present disclosure for preparing ammonia gas by using a fluidized bed.

FIG. 2 is a schematic diagram of the embodiment 1 of the present disclosure for preparing the ammonia gas by using the fluidized bed, in which a certain amount of particulate silicate raw materials enter a fluidized bed reactor 10 through a solid feeding device 15, the aqueous solution of the ammonium salt are in the form of atomized droplets under the action of a high-pressure liquefying pump 14 and a nozzle 16 and are contacted with the silicate particle to perform reaction to generate the solid substance and the ammonia gas; the solid substance is extracted, and part of the solid substance is circulated to be mixed with the fresh silicate particle; then, the ammonia gas and a water vapor are escaped along with a carrier gas to enter a gas and solid separation device 11, and part of the separated gas phase containing the ammonia gas is led out, one part of which is circulated to be mixed with a fresh carrier gas for entering a moving bed reactor 10 through a gas distributor 13 after being preheated by a preheater 12.

As a specific embodiment, the total volume of the fluidized bed reactor used in the present embodiment is 10 L, with a height-diameter ratio of 5:1, that is, the reactor is 0.136 m in diameter and 0.69 m in height; the present embodiment employs serpentine with the magnesium silicate content of 86 percent as the solid particle, in which the average particle size of the particle is 0.8 mm; the ammonium salt adopts ammonium sulfate, and a molar ratio of the ammonium sulfate to the magnesium sulfate in the reaction process is 1:4.

With an air serves as the carrier gas and an operation performed under a normal pressure, the air is preheated to 500 DEG C. in the preheater, wherein the hot air rate is 15.4 m3/h (under the standard condition), the working temperature of the reactor is controlled to 350 DEG C., the temperature of the ammonium sulfate solution is 90 DEG C., the mass percentage is 43.6 percent, and the spray quantity is 1 kg/h; then, 50 percent of circulation quantity of the outlet waste gas is adjusted, so that the ratio of the extraction quantity of the solid substance to the use amount of the solid substance returning to the reactor is 1:7.5 (mass ratio), the supplementing quantity of the serpentine particle is 0.18 kg/h, obtaining results as shown in Table 1:

TABLE 1

Results of reaction in the 10 L fluidized bed reactor

| | Material | |
|---|---|---|
| | Magnesium sulfate | Ammonia gas |
| Flow/kg/h | 0.177 | 0.05 |
| Conversion rate (%) of ammonium sulfate | 89.1 | |
| Conversion rate (%) of magnesium silicate | 95.4 | |

Embodiment 2

Figure 3:
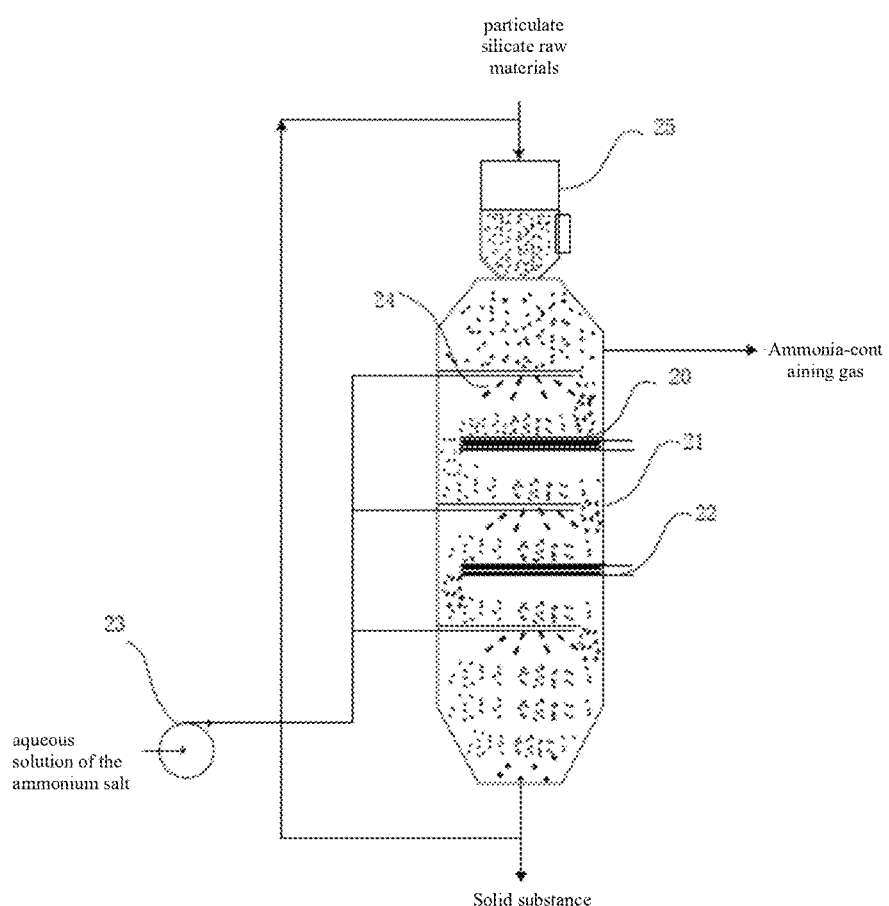
FIG. 3 is a schematic diagram of an embodiment 2 of the present disclosure for preparing ammonia gas by using a moving bed.

FIG. 3 is a schematic diagram of preparing the ammonia gas by using a moving bed in Embodiment 2, a certain amount of particulate silicate raw materials enter a moving bed reactor 21 through a solid feeding device 25 and perform a bending movement under the action of a deflection baffle 21; a high-temperature medium supplies heat for the system through a heating coiled pipe 22, and the aqueous solution of the ammonium salt are in the form of atomized droplets under the action of a high-pressure liquefying pump 23 and a nozzle 24 and are contacted with the silicate particle to perform reaction to generate the solid substance and the ammonia gas, in which the ammonia gas is led out, the solid substance is extracted, and part of the solid substance is circulated to be mixed with the fresh silicate particle.

As a specific embodiment, the total volume of the moving bed reactor used in the present embodiment is 10 L, with a height-diameter ratio of 20:1, that is, the reactor is 0.086 m in diameter and 1.72 m in height; an atomizing nozzle and a heating coiled pipe are arranged below each deflection baffle (not all shown in figure), the embodiment employs serpentine with a magnesium silicate content of 86 percent as the solid particle, wherein the average particle size of the particle is 0.8 mm; the ammonium salt adopts ammonium sulfate. The molar ratio of the ammonium sulfate to the magnesium silicate is 1:4, the working temperature of the reactor is controlled to 350 DEG C., the high-temperature medium is a heat-conducting oil, the temperature of the ammonium sulfate solution is 90 DEG C., the mass percentage is 43.6 percent, the spray quantity is 1 kg/h, the ratio of the extraction quantity of the solid substance to the use amount of the solid substance returning to the reactor is 1:7.5 (mass ratio), and the supplementing quantity of the serpentine particle is 0.18 kg/h, obtaining results as shown in Table 2:

TABLE 2

Results of reaction in the 10 L moving bed reactor

| | Material | |
|---|---|---|
| | Magnesium sulfate | Ammonia gas |
| Flow/kg/h | 0.159 | 0.045 |
| Conversion rate (%) of ammonium sulfate | 80.2 | |
| Conversion rate (%) of magnesium silicate | 85.8 | |

Embodiment 3

Equipment and process flow used in the present embodiment are as same as those in Embodiment 1 except in that the present embodiment employs aedelforsite with a calcium silicate content of 85 percent as the solid particle, wherein the average particle size of the particle is 0.8 mm, and the ammonium salt adopts the ammonium chloride. The molar ratio of the ammonium chloride to the calcium silicate is 1:2; with an air serves as the carrier gas and an operation performed under a normal pressure, the air is preheated to 450 DEG C. in the preheater, wherein the hot air rate is 15.4 m3/h (under the standard condition), the working temperature of the reactor is controlled to 300 DEG C., the temperature of the ammonium chloride solution is 90 DEG C., the mass percentage is 40.8 percent, and the spray quantity is 0.3 kg/h; 50 percent of circulation quantity of the outlet waste gas is adjusted, so that the ratio of the extraction quantity of the solid substance to the use amount of the solid substance returning to the reactor is 1:4 (mass ratio), and the supplementing quantity of the aedelforsite particle is 0.14 kg/h, obtaining reaction results as shown in Table 3:

TABLE 3

Results of the reaction of the ammonium chloride and the aedelforsite in the 10 L fluidized bed reactor

|  | Material | |
| --- | --- | --- |
|  | Calcium chloride | Ammonia gas |
| Flow/kg/h | 0.108 | 0.033 |
| Conversion rate (%) of ammonium chloride |  | 79.4 |
| Conversion rate (%) of calcium silicate |  | 94.7 |

Embodiment 4

Equipment and process flow used in the present embodiment are as same as those in Embodiment 2 except in that the present embodiment employs aedelforsite with a calcium silicate content of 85 percent as the solid particle, wherein the average particle size of the particle is 0.8 mm, and the ammonium salt adopts the ammonium chloride. The molar ratio of the ammonium chloride to the calcium silicate is 1:2, the working temperature of the reactor is controlled to 300 DEG C., the high-temperature medium is heat-conducting oil, the temperature of the ammonium chloride solution is 90 DEG C., the mass percentage is 40.8 percent, and the spray quantity is 0.3 kg/h; 50 percent of the circulating quantity of the outlet waste gas is adjusted, so that the ratio of the extraction quantity of the solid substance to the use amount of the solid substance returning to the reactor is 1:4 (mass ratio), and the supplementing quantity of the aedelforsite particle is 0.14 kg/h, obtaining reaction results as shown in Table 4:

TABLE 4

Results of the reaction of the ammonium chloride and the aedelforsite in the 10 L moving bed reactor

|  | Material | |
| --- | --- | --- |
|  | Calcium chloride | Ammonia gas |
| Flow/kg/h | 0.098 | 0.03 |
| Conversion rate (%) of ammonium chloride |  | 72.2 |
| Conversion rate (%) of calcium silicate |  | 86.1 |

Embodiment 5

Equipment and process flow used in the present embodiment are as same as those in Embodiment 3 except in that the working temperature of the fluidized beds of the embodiment is controlled to 200 DEG C., 250 DEG C., 400 DEG C. and 450 DEG C., and the reaction results are as shown in Table 5:

TABLE 5

Results of the reaction of the ammonium chloride and the aedelforsite in the 10 L fluidized bed reactor

|  | temperature | | | |
| --- | --- | --- | --- | --- |
|  | 200 | 250 | 400 | 450 |
| Conversion rate (%) of ammonium chloride | 72.2 | 74.6 | 81.8 | 80.6 |
| Conversion rate (%) of calcium silicate | 86.1 | 89 | 97.6 | 96.2 |

It can be seen from the above embodiments, under the same condition, the conversion rate is higher when the disclosure adopts the fluidized bed.

It should be noted that, according to the common knowledge of those skilled in the art, corresponding measuring devices, control devices and corresponding valves for temperature, liquid level and the like are arranged on the decomposition reactor and the regeneration reactor, which are not shown in the drawings one by one. This does not indicate that these conventional designs are not included in the process of the present disclosure. Adjusting the feed rate of the raw materials in the present disclosure according to the conversion rate and the material balance is also a conventional design common knowledge of those skilled in the art, and there is no description in the present disclosure, and this does not indicate that the conventional design is not included in the process of the present disclosure.

According to the embodiments of the present disclosure described above, the embodiments do not describe all the details in detail, and the present disclosure is not limited to the specific embodiments. Obviously, many modifications and changes can be made according to the above description. The description selects and specifically describes the embodiments to explain the principle and the actual application of the present disclosure well, so that those skilled in the art can utilize the present disclosure well, and perform modification and use on the basis of the present disclosure.

What is claimed is:

1. A method for preparing ammonia gas through a reaction between an ammonium salt and a silicate, comprising preparing ammonia gas through a reaction between an ammonium salt aqueous solution and a silicate at a high temperature,
   wherein, the ammonium salt aqueous solution in form of atomized droplets is contacted with the silicate at a high temperature in form of solid particle in a reactor, so that a reaction occurs on surfaces of a silicate solid particle to generate the ammonia gas and a solid substance;
   the ammonia gas obtained by the reaction is collected to obtain an ammonia gas product; and
   a part of the solid substance is extracted, and the part of the same solid substance is mixed with a fresh silicate solid particle, then a mixture is returned to the reactor and continuously reacted with the atomized droplets of the ammonium salt aqueous solution.

2. The method according to claim 1, wherein the silicate is a salt formed by a silicate radical and an alkali metal or an alkaline earth metal; and the ammonium salt is a salt formed by an ammonium radical and an acid radical of a strong acid.

3. The method according to claim 1, wherein a temperature of the silicate is 80 to 600 DEG C.

4. The method according to claim 1, wherein the ammonium salt aqueous solution is a saturated ammonium salt aqueous solution.

5. The method according to claim 1, wherein a ratio of amount of substance of the ammonium salt to the amount of substance of the silicate is 1:2-1:6.

6. The method according to claim 1, wherein a mass ratio of the amount of the solid substance extracting from the reactor to the amount of the solid substance recycling to the reactor is 1:2-1:8.

7. The method according to claim 1, wherein the reactor is a moving bed reactor or a fluidized bed reactor.

8. The method according to claim 1, wherein the silicate solid particle is the solid particle containing one or more of calcium silicate, magnesium silicate, sodium silicate and potassium silicate; a source of the silicate solid particle comprises: pulverizing and grinding of an ore containing the silicate as well as a plurality of silicate crystal particle obtained through chemical synthesis methods; and the ammonium salt is one or more of ammonium chloride, ammonium sulfide or ammonium hydrogen sulfate.

9. The according to claim 3, wherein the temperature of the silicate at a high temperature in form of solid particle is 200 to 450 DEG C.

* * * * *